United States Patent
Kates et al.

(10) Patent No.: US 7,127,675 B1
(45) Date of Patent: Oct. 24, 2006

(54) METHOD AND SYSTEM FOR AUTOMATICALLY REVISING SOFTWARE HELP DOCUMENTATION

(75) Inventors: Jesse M. Kates, Kansas City, MO (US); Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 640 days.

(21) Appl. No.: 10/196,083

(22) Filed: Jul. 15, 2002

(51) Int. Cl.
*G06F 3/00* (2006.01)
*G06F 9/44* (2006.01)

(52) U.S. Cl. ..................... 715/705; 717/123
(58) Field of Classification Search ................ 717/123, 717/110, 100; 702/98; 715/500, 705
See application file for complete search history.

(56) References Cited

U.S. PATENT DOCUMENTS

| | | | |
|---|---|---|---|
| 6,257,774 B1 * | 7/2001 | Stack | 717/110 |
| 6,259,445 B1 * | 7/2001 | Hennum et al. | 715/709 |
| 6,369,836 B1 * | 4/2002 | Larson et al. | 715/763 |
| 6,467,080 B1 * | 10/2002 | Devine et al. | 717/123 |
| 6,826,500 B1 * | 11/2004 | Linthicum et al. | 702/98 |
| 2003/0055850 A1 * | 3/2003 | Larsen | 707/500 |

FOREIGN PATENT DOCUMENTS

WO   WO 200229759   * 4/2002

OTHER PUBLICATIONS

"Analyzing Data Bases Through OS/2; Data access for multiple", Capacity Management Review. Naples: Apr. 1993. vol. 21, Iss. 4; p. 10, 1 pg.*

* cited by examiner

*Primary Examiner*—Wei Zhen
*Assistant Examiner*—Chih-Ching Chow

(57) ABSTRACT

A method and system for establishing software documentation is provided. Rather than being static, the set of user accessible software documentation for a particular software program could be dynamically updated. The software documentation set accessible by the user may be defined by the configuration state of one or more configuration parameters at any given time. Once the states of the configuration parameters are determined, the program will dynamically update the set of accessible software documentation based at least in part on the configuration states of the configuration parameters. Thus, for any configuration state, only software documentation deemed relevant to the state of the software application could be made accessible to the user, thereby providing a more concise, focused and easily navigable set of software documentation.

17 Claims, 3 Drawing Sheets

METHOD AND SYSTEM FOR AUTOMATICALLY REVISING SOFTWARE HELP DOCUMENTATION

BACKGROUND

1. Field of the Invention

The present invention relates to computer software, and more particularly to a method and system for automatically establishing software documentation.

2. Description of Related Art

In modern computer systems, software documentation is generally static. The developer of a given software application will develop a fixed set of documentation that describes how to use various features of the software, and the developer will distribute that documentation together with, or as part of, the software. As required, users may refer to the fixed documentation to determine how the software operates.

Software documentation can take various forms, such as a printed manual or an electronic, software based help system. Typically, the documentation is divided into sections or "help topic descriptions," each explaining a particular aspect of the software. In an electronic help system, for instance, each help topic description might be set forth in a respective data record or data file, and hyperlinks and/or an electronic index system might allow a user to navigate through the topics.

A software developer will usually design software such that, when the software is installed on a computer, the help topic descriptions for the software will be loaded onto the computer as well. In this regard, a given software application might be made up of a number of selectively-installable modules, and the software developer might prepare corresponding help topic descriptions for each module. When certain modules of the software are installed, the help topic descriptions for those modules will then be loaded onto the computer, so that a user interacting with the software can access those help topic descriptions as desired.

In use, most software can be configured to operate in a number of different ways, so as to accommodate user (administrator or end-user) preferences, for instance. In this regard, a given software application (or module) may have a set of configuration parameters (effectively state variables), each of which a user may set to a desired state through use of a setup or options panel, for instance, so as to cause the software to operate in a desired manner.

Static software documentation, however, does not dynamically take into account the state of configuration parameters. Rather, at best, static software documentation may describe the possible states of the parameters as well as the implications of setting a given parameter to a given state. Thus, a system that provides for software documentation that dynamically tracks software configurations is needed.

SUMMARY

In a first principal aspect, an exemplary embodiment provides a method for updating software documentation. The software documentation is updated by determining whether at least one configuration parameter in a software application has a particular configuration state matching a predefined state when the software application is being executed. If a match exists, the set of software documentation descriptions available for access by a user of the software application is revised.

In a second principal aspect, the software documentation is updated by detecting a change in state of a configuration parameter in a software application while the software application is being executed. If a change in state of a configuration parameter is detected, it can be determined whether at least one configuration parameter in the software application has a particular configuration state matching a predefined state. If a match is found, the set of software documentation descriptions available for access by a user of the software application is revised.

In a third principal aspect, an exemplary embodiment includes a computer readable medium having stored thereon instructions executable by a processor to carry out the function of updating the set of software documentation descriptions available for access by a user of the software documentation. This is achieved by detecting a change in state of a configuration parameter in a software application while the software application is being executed. After a change in state has been detected, the processor can determine whether at least one configuration parameter in the software application has a particular configuration state matching a predefined state. If a match exists, the set of software documentation descriptions available for access by a user of the software application may be revised.

In a fourth principal aspect, an exemplary embodiment includes a processor, data storage, and machine language instructions that are stored in the data storage and executable by the processor. Using the machine language instructions, the processor can determine whether at least one configuration parameter in a software application has a particular configuration state matching a predefined state while the software application is being executed. If so, the set of software documentation descriptions available for access by a user of the software application can be revised.

In a fifth principal aspect, an exemplary embodiment includes a processor, data storage, and machine language instructions stored in the data storage and executable by the processor to perform the following steps: (i) detect a change in state of a configuration parameter in a software application while the software application is being executed, (ii) responsively determine whether at least one configuration parameter in the software application has a particular configuration state matching a predefined state, and if a match exists, (iii) revise a set of software documentation descriptions available for access by a user of the software application.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Static software documentation does not dynamically take into account the state of configuration parameters. Rather, at best, static software documentation may describe the possible states of the parameters as well as the implications of setting a given parameter to a given state. Thus, a system that provides for software documentation that dynamically tracks software configurations is needed.

The present invention is directed to an improvement over static software documentation by providing a mechanism for dynamically varying software documentation based on the state of one or more configuration parameters. In particular, according to an exemplary embodiment of the invention, the state of one or more configuration parameters at any moment will determine what if any help topic description(s) will be available for access by a user at that moment.

As a specific example, a user might enable a particular software feature by checking option box. After doing so, a help topic directed to the newly enabled feature could be made available; the help topic would previously have been unavailable since the feature was not enabled.

Figure 1:
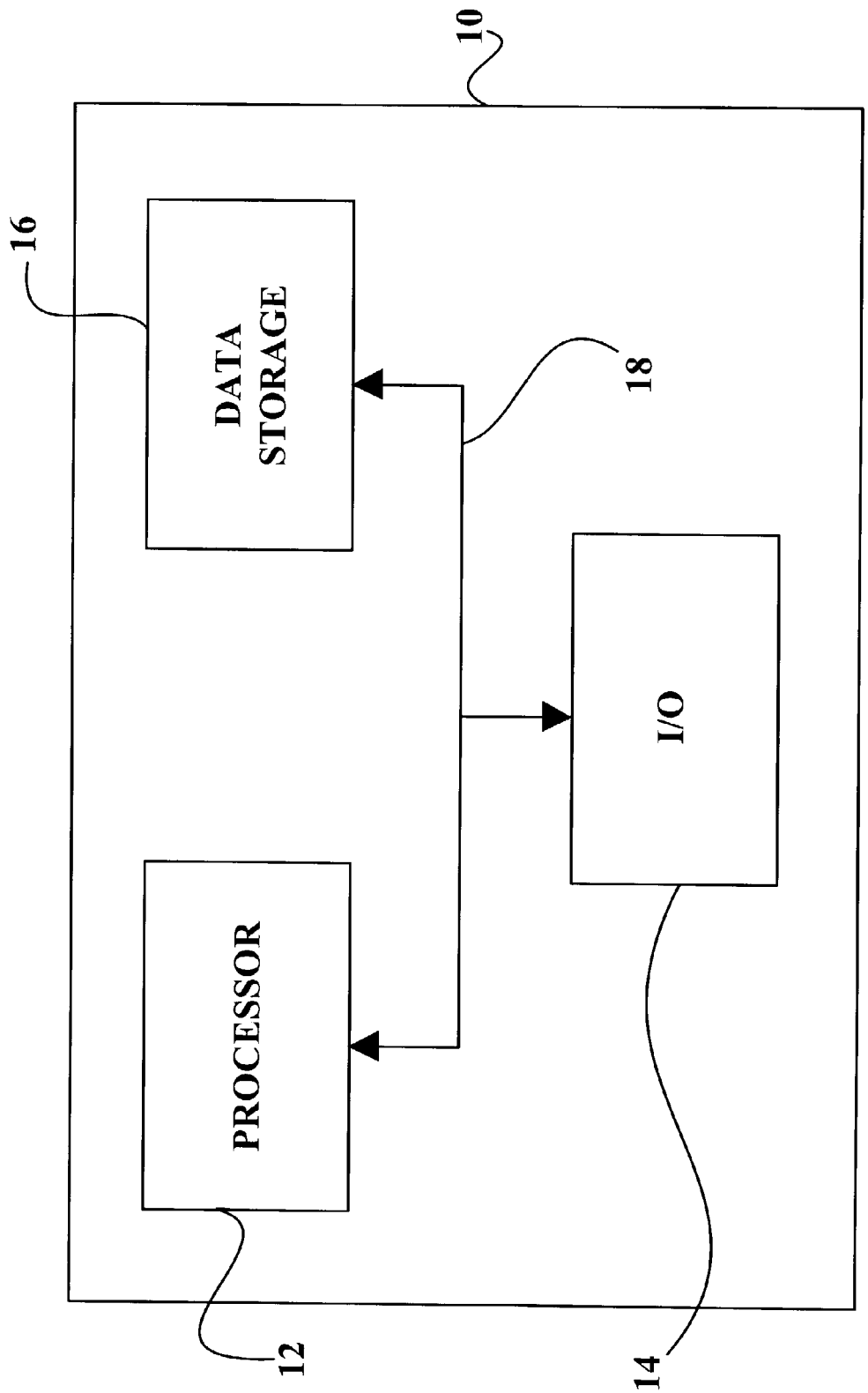
FIG. 1 is a block diagram of a computer system that may be used in accordance with an exemplary embodiment of the invention.

Referring to the drawings, FIG. 1 is a simplified block diagram of a computer system 10 suitable for carrying out exemplary embodiments of the invention. The computer system 10 includes a processor 12; input/output (I/O) devices, such as a display, a keyboard, a mouse, and associated controllers, collectively designated by reference numeral 14; and data storage devices, such as memory, a hard disk drive, or other computer readable media collectively designated as data storage 16, all interconnected via one or more busses shown collectively as a bus 18. A software program, machine language instructions, or both, executable by the processor 12, may be loaded into data storage 16 of the computer system 10.

It should be understood that this and other arrangements and processes described herein are set forth for purposes of example only, and other arrangements and elements (e.g., machines, interfaces, functions, orders of functions, etc.) can be added or used instead, and some elements may be omitted altogether.

In an exemplary embodiment of the invention, a software application may define a number of configuration parameters, each of which can be set to a given state, so as to define a number of "configuration parameter states." For example, the application may define only one configuration parameter A that can be set to state A1 or A2. In this case, the possible configuration parameter states are {A1, A2}. However, in addition to configuration parameter A, the application may define additional configuration parameters, B and C, for example, that can be set to states B1, B2, or B3 and C1 or C2, respectively. If the application defines configuration parameters A, B, and C as discussed above, possible configuration parameter states are {A1, A2}, {B1, B2, B3}, and {C1, C2}. Further, each of the configuration parameters may have a default or "base" state. For instance, the default state of parameter A may be A1, the default state of parameter B may be B1, and the default state of parameter C may be C1. The state of the software application at any one time determines the states of the configuration parameters at that time.

At any given moment, all of the configuration parameter states within the software application collectively make up a "configuration parameter state set" or simply a "configuration state set." When all of the configuration parameters are in their default states, the software will be in its default configuration state set. As the states of the configuration parameters change, the configuration state set will accordingly change to some variant. For instance, in the example above, the default configuration state set would be {A1, B1, C1}. Examples of variant configuration state sets might be {A2, B1, C1} or {A2, B3, C2}.

Additionally, the software application will have software documentation that comprises a set of help topic descriptions (referred to as a "help topic description set" or simply as a "description set") available for access by a user through an electronic help system, for instance. An electronic help system is one where a user can navigate, via a graphical interface, a variety of help topics. With any given configuration state set, the software application may also define some help topic descriptions that are not available for access by a user and are therefore not considered part the description set or part of the software documentation.

Each of the help topic descriptions may be stored in some data storage and referenced by a filename or index. For instance, each help topic description may be stored as a respective database record and labeled by the abbreviation "HT" followed by an index number, such as HT001, HT002, HT003, HT004, HT005, etc. Each help topic description may simply include a Boolean flag indicating whether it is part of the software documentation, i.e., whether or not it is available for access by a user. As an example, in the table below, HT001 and HT003 would be available for access by a user because a Boolean flag of 1 indicates that a help topic description is available, whereas a Boolean flag of 0 (as shown by HT002, HT004, and HT005) indicates that the description is not available. Other implementations are possible as well.

HT001=1
HT002=0
HT003=1
HT004=0
HT005=0

In accordance with the exemplary embodiment, the description set will dynamically vary based (at least in part) on the configuration state set. Therefore, as the configuration state set varies, so may the description set.

Figure 2:
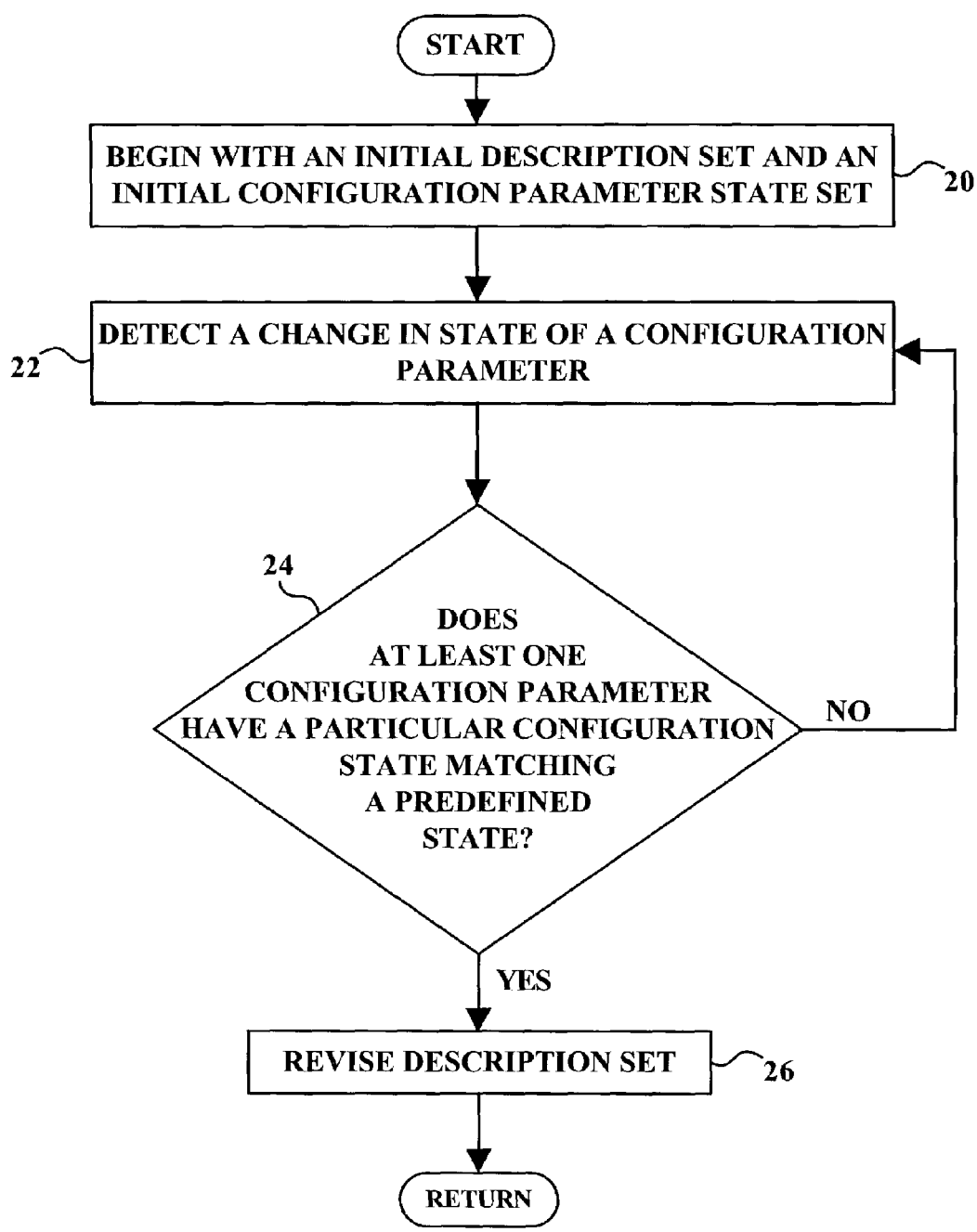
FIG. 2 is a flow chart illustrating a functional process flow in an exemplary embodiment of the invention.

Referring to FIG. 2 at step 20, initially a software application that has configuration parameters may have an initial configuration parameter state set and a corresponding initial software documentation description set that allows a user to access specific software documentation. As shown in step 22, a change in configuration state of at least one configuration parameter can be detected. Next, as shown in step 24, upon detection of a change in configuration state of at least one configuration parameter, the resulting configuration state set is compared to predefined configuration state sets. If a plurality of configuration parameters exists, the resulting set of configuration states is compared with one or more predefined sets of configuration states.

Next, as shown in step 26, if the current configuration state or set of configuration states of the configuration parameter(s) match a predefined configuration state or set of configuration states, the description set is modified based on that match, thereby changing the set of software documentation accessible to the user. On the other hand, if the current configuration state or set of configuration states does not match a predefined configuration state or set of configuration states, the description set is not modified, and the software documentation accessible to the user remains unchanged. Although not shown, the steps of FIG. 2 may be repeated continuously.

As an illustration, and continuing with the above example, assume that when the configuration state set is {A2, B2, C1}, the description set could be {HT002, HT004, HT005}, thus, help topic descriptions HT002, HT004 and HT005 would be available for access by a user. In turn, if configuration parameter A changes to A1, then the description set might dynamically change to include help topic description HT001 as well, so that the user could access any help topic description from the set {HT001, HT002, HT004, HT005}. Further, if the state of configuration parameter C changes to C2, then the description set might dynamically change to include help topic description HT006 and no longer include help topic description HT005. Thus, the user could then access any help topic description from the set {HT001, HT002, HT004, HT006}. Other combinations are possible as well.

The software application (or an associated help module/system) can carry out this dynamic variation of software documentation in many different ways. In accordance with the exemplary embodiment, for instance, one way to dynamically update software documentation is to programmatically define changes to be made to the description set in response to the occurrence of (i) a particular configuration parameter state and/or (ii) a particular combination of configuration parameter states.

Figure 3:
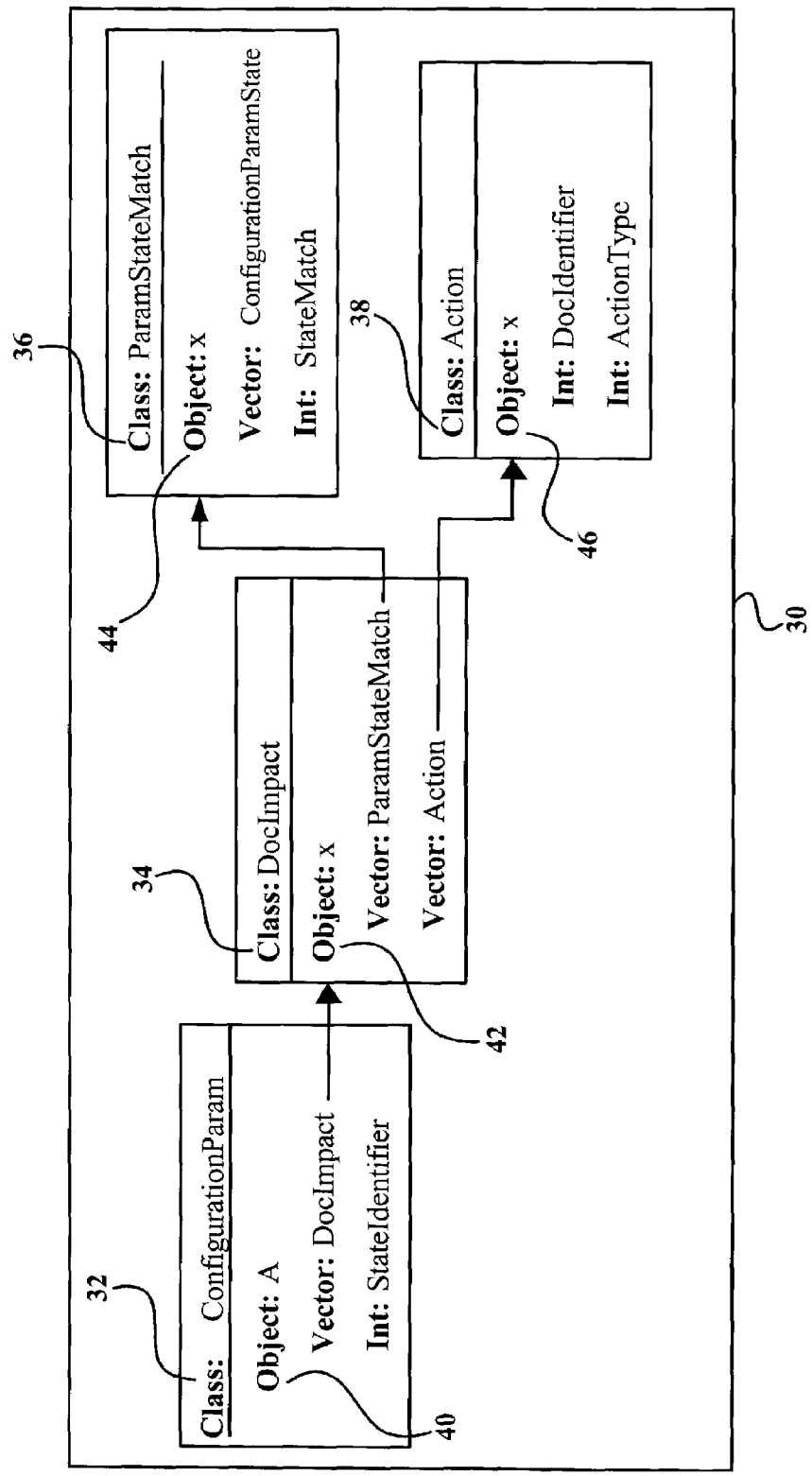
FIG. 3 is a block diagram depicting operation of an exemplary embodiment of the invention.

Referring next to FIG. 3, a simplified block diagram of an exemplary software application 30 for dynamically revising the description set is shown. The software application 30 can define "object classes," and specific instances of object classes, called objects. Object classes are basic building blocks of many programming languages and function as templates that describe data and behavior associated with objects of a class. The software program can also define vectors, which are collections of objects.

In the exemplary embodiment, the object classes defined by the software application 30 may include a "ConfigurationParam" class 32, a "DocImpact" class 34, a "ParamStateMatch" class 36, and an "Action" class 38. The software application 30 can define and tie these classes together as shown in FIG. 3. In particular, the software application 30 of the preferred embodiment could define the following classes and arrangement of classes:

(1) ConfigurationParam. Each of a plurality of configuration parameters would exist in the software application as ConfigurationParam objects 40. Each instance of a ConfigurationParam object 40 will have (i) a configuration state, stored in a "StateIdentifier" variable, and (ii) a vector of one or more DocImpact objects 42.

(2) DocImpact. Each DocImpact object 42 will have (i) a vector of one or more ParamStateMatch objects 44 and (ii) a vector of one or more Action objects 46.

(3) ParamStateMatch. Each ParamStateMatch object 44 will have (i) a ConfigurationParamState vector of one or more configuration parameter states and (ii) a StateMatch variable indicating whether the configuration parameter states currently exist. For instance, a ParamStateMatch object 44 may specify a combination of configuration parameter states A2, B1 and C2. If A is in state A2, B is in state B1 and C is in state C2, then the StateMatch variable of that ParamStateMatch object 44 may be True; if any of those configuration parameter states do not match, then the StateMatch variable of the ParamStateMatch object 44 may be False.

(4) Action. Each Action object 46 will have (i) an associated DocIdentifier variable that points to a particular help topic description, by index number (e.g., HT001), and (ii) an associated ActionType, which indicates whether to add or remove the help topic description from the description set.

In operation, whenever the state of a configuration parameter changes in the software application 30 (e.g., through user action or for some other reason, such as program control), the software application 30 will traverse, or read, the vector of the DocImpact objects 42 associated with that configuration parameter. For each DocImpact object 42, the software application 30 will then traverse the vector of ParamStateMatch objects 44 to determine whether any of the ParamStateMatch objects 44 have a "True" StateMatch, reflecting a particular configuration parameter state or combination of configuration parameter states.

For each DocImpact object 42, if the software application 30 finds that at least one of the ParamStateMatch objects 44 has a "True" StateMatch, then the software application 30 will apply each of the actions indicated by the vector of Action objects 46 for that DocImpact object 42. In particular, for each such Action object 46, the software application 30 will carry out the ActionType (e.g., add or remove, as required) with respect to the help topic description indicated by the DocIdentifier variable.

As a more specific example of this process, consider a software application that allows a user to connect with a remote server. Such an application might store a user's access password and provide the password automatically to the remote server upon connection. Because some users may not want the application to automatically provide a password, however, the software application might allow a user to designate whether or not the software application should do so. For this purpose, the software application might have a configuration parameter A that indicates whether to provide a user password upon connection. Parameter A might have two possible states, A1, indicating that the software application should provide a password, and A2, indicating that the software application should not provide a password.

Additionally, the software application might define a UserPassword string variable that stores the user's password when initially provided by the user. The application might have another configuration parameter B that indicates whether a user password has been saved in the "UserPassword" variable, i.e., whether or not the software application has a user password to provide to the remote server. Parameter B might have two possible states, B1 indicating that UserPassword contains a user password, and B2 indicating that UserPassword is empty (or contains an invalid password).

Assume further that the default state of configuration parameter A is A2, indicating that a password should not be automatically provided, and that the default state of configuration parameter B is B2, indicating that the UserPassword variable is empty.

Such a software application might have a user options panel through which an end-user can indicate whether the software application should automatically provide a password upon connection to the remote server. The user options panel, for instance, might present a checkbox that the user can (i) set in order to indicate that the software application should automatically provide a password upon connection or (ii) clear in order to indicate that the software application should not automatically provide a password upon connection. When the user sets the checkbox, the state of configuration parameter A would be set to A1, and when the user clears the checkbox, the state of configuration parameter A would be set to A2.

Additionally, the options panel may include a textbox in which the user can specify a password to provide. When the user enters a password into the textbox, the state of configuration parameter B would be set to B1, and when the user clears the textbox (or does not enter anything into the textbox), the state of configuration parameter B would be set to B2.

Assume further that the software application includes an administrator options panel through which an administrator of the software application can indicate whether to allow use of the automatic password-providing function. In this regard, the software application might have another configuration parameter C, which indicates whether to allow use of the automatic password-providing function. Parameter C might have two possible states, C1 (default state) indicating that the automatic password-providing function is available for use, and C2, indicating that the automatic password-providing function is not available for use. When parameter C is in state C1, the software application might preclude access to the checkbox and textbox of the user options panel, and when in state C2, the software application might allow access to the checkbox and textbox of the user options panel.

To help illustrate how the exemplary embodiment may work in this context, assume that a software application includes the following help topic descriptions, each having a respective DocIdentifier index as indicated:

(1) HT001—Description of how to make the software application automatically provide a password upon connection, including a description of how to enter a valid password into the password textbox and how to set the checkbox.
(2) HT002—Description of how to enter a valid password into the textbox to enable the application to automatically provide the password upon connection.
(3) HT003—Description of how to clear the checkbox to turn off the automatic password-providing function.
(4) HT004—Description of how to allow the automatic password-providing function through the administrator options panel.
(5) HT005—Description of how to disallow the automatic password-providing function through the administrator options panel.

Upon initial installation of the software application, configuration parameters A, B, and C will be in their default states. Therefore, the automatic password-providing function will be accessible through the options panel (state C1), the checkbox in the user options panel will be cleared (state A2), and the UserPassword variable will be empty (state B2). Accordingly, the available help topic descriptions in the software documentation are HT001 and HT005, to explain to a user how to make the software application automatically provide a password upon connection, and to explain to an administrator how to disallow the automatic password-providing function.

The set of available help topic descriptions in this example will not include HT002 (how to enter a valid password), since HT001 already explains how to do so in conjunction with setting the checkbox, nor will it include HT003 (how to clear the checkbox), since the checkbox is not yet set.

Now, if the user clicks the checkbox in the user options panel to turn on the automatic password-providing function, configuration parameter A would switch from state A2 to state A1. Pursuant to the exemplary embodiment, the application would then traverse a list of DocImpact objects for parameter A.

One such DocImpact object might include in its vector of ParamStateMatch objects the set of configuration parameter states {C1, A1, B2}, reflecting that (i) the automatic password-providing function is allowed, (ii) the checkbox in the user options panel is set, and (iii) the textbox is empty. Additionally, the Action vector of that DocImpact object might list as actions: (a) remove HT001 from the description set, (b) add HT002 to the description set (to explain how to insert a valid password in the textbox), and (c) add HT003 to the description set (to explain how to clear the checkbox that the user just set).

Because the software application will find that states C1, A1, and B2 currently exist, the software application will detect a "True" StateMatch in the ParamStateMatch noted above. Consequently, the software application will apply all three of the actions noted above, removing description HT001 from the description set while adding descriptions HT002 and HT003 to the set.

As a result, the set of help topic descriptions available for access by the user will change from {HT001, HT005} to {HT002, HT003, HT005}. When the user then accesses the software documentation, the user can learn how to insert a valid password in the textbox and how to clear the checkbox, but the software documentation would not explain to the user how to set the checkbox (as in HT001), because the checkbox is already set.

As another example, assume that the user enters a valid password in the textbox, causing variable B to change from B2 to B1. Consequently, the software application will traverse a vector of DocImpact objects associated with configuration parameter B. One such DocImpact object might include in its vector of ParamStateMatch objects the set of configuration parameter states {C1, A1, B1}, reflecting that (i) the automatic password-providing function is allowed, (ii) the checkbox in the user options panel is set, and (iii) the textbox is filled. Further, the Action vector of that DocImpact object might list as actions: (a) remove HT001 from the description set, (b) remove HT002 from the description set, and (c) add HT003 to the description set (to explain how to clear the checkbox).

Because the software application will find that states C1, A1, and B1 currently exist, the application will detect a "True" StateMatch in the ParamStateMatch object, causing the application to apply all three of the actions noted above, removing descriptions HT001 and HT002 from the description set (which has no impact on HT001, which was already removed), and adding description HT003 to the description set (which has no impact on HT003, since HT003 was already added).

As a result, the set of help topic descriptions available for access by the user will change from {HT002, HT003, HT005} to {HT003, HT005}. When the user then accesses the software documentation, the user can learn how to clear the checkbox in order to disable the automatic password-providing function. In this example, the software documentation would not explain how to set the checkbox or enter a valid password, since the checkbox is already set and the password is already entered.

As a final example, assume that an administrator sets the application to reflect that the automatic password-providing function should not be allowed. As a result, configuration parameter C would change from state C1 to state C2, and the software application will traverse a vector of DocImpact objects associated with configuration parameter C. One such DocImpact object might include in its vector of ParamStateMatch objects the one-member set of configuration parameter states {C2}, reflecting that the automatic password-providing function is not allowed. Further, the Action vector of that DocImpact object might list as actions: (a) remove HT001 from the description set, (b) remove HT002 from the description set, (c) remove HT003 from the description set, (d) remove HT005 from the description set, and (e) add HT004 to the description set (to explain how to enable the automatic password-providing function).

Because the application will find that state C2 currently exists, the software application will detect a "True" StateMatch in the ParamStateMatch object, and the software application will apply all five of the actions noted above, removing descriptions HT001, HT002, HT003, and HT005 from the description set (which has no impact on HT001 and HT002, which were already removed), and adding description HT004 to the description set (to explain how an administrator can enable the automatic password-providing function once again).

As a result, the set of help topic descriptions available for access by the user will change from {HT003, HT005} to {HT004}, and the software documentation will not explain anything about how to set the checkbox or specify a password in the user options panel, since those functions have been disabled. However, the software documentation will explain how an administrator can enable the automatic password-providing function.

Although the above scenarios describe invoking action(s) for a single DocImpact object when the state of a configuration parameter changes, it is possible that multiple actions could be invoked for multiple DocImpact objects when the state of a configuration parameter changes. For instance, one DocImpact object might cause a first set of actions to be carried out upon detection of a StateMatch, and another DocImpact object might cause a second, different set of actions to be carried out upon detection of some other StateMatch.

An exemplary embodiment of the present invention has been described above. Those skilled in the art will understand, however, that changes and modifications may be made to this embodiment without departing from the true scope and spirit of the present invention, which is defined by the claims.

We claim:

1. A computer-implemented method comprising:
   detecting a change in state of a configuration parameter in a software application while the software application is being executed; and
   responsively determining whether at least one configuration parameter in the software application has a particular configuration state matching a predefined state, and (i) if so, then dynamically revising a set of help topic descriptions available for access by a user of the software application, the help topic descriptions being associated with the software application, and (ii) if not, then not dynamically revising the set of help topic descriptions available for access by the user of the software application.

2. The method of claim 1, wherein the at least one configuration parameter comprises a plurality of configuration parameters, each of the plurality of configuration parameters having a respective configuration state, the respective configuration states defining a configuration state set, and wherein determining whether the at least one configuration parameter has a particular configuration state matching a predefined state comprises:
   comparing the configuration state set to one or more predefined sets of configuration states; and
   determining whether the configuration state set matches at least one of the one or more predefined sets of configuration states.

3. The method of claim 1, wherein revising the set of help topic descriptions comprises removing at least one description from the set of help topic descriptions.

4. The method of claim 1, wherein revising the set of help topic descriptions comprises adding at least one description to the set of help topic descriptions.

5. The method of claim 1, further comprising:
   making the set of help topic descriptions available for access by the user through an electronic help system.

6. A computer readable medium having stored thereon instructions executable by a processor to carry out the following functions:
   detecting a change in state of a configuration parameter in a software application while the software application is being executed; and
   responsively determining whether at least one configuration parameter in the software application has a particular configuration state matching a predefined state, and (i) if so, then dynamically revising a set of help topic descriptions available for access by a user of the software application, the help topic descriptions being associated with the software application, and (ii) if not, then not dynamically revising the set of help topic descriptions available for access by the user of the software application.

7. The computer readable medium of claim 6, wherein the software application is defined, at least in part, by the instructions.

8. The computer readable medium of claim 6, wherein the set of help topic descriptions are available for access by a user through an electronic help system.

9. A system comprising:
   a processor;
   data storage; and
   machine language instructions stored in the data storage and executable by the processor to:
   detect a change in state of a configuration parameter in a software application while the software application is being executed;
   responsively determine whether at least one configuration parameter in the software application has a particular configuration state matching a predefined state; and (i) if at least one configuration parameter has a particular configuration state matching a predefined state, then dynamically revise a set of help topic descriptions available for access by a user of the software application, the help topic descriptions being associated with the software application, and (ii) if the at least one configuration parameter does not have a configuration state matching the predefined state, then do not dynamically revise the set of help topic descriptions available for access by the user of the software application.

10. The system of claim 9, wherein the at least one configuration parameter comprises a plurality of configuration parameters, each of the plurality of configuration parameters having a respective configuration state, the respective configuration states defining a configuration state set, and wherein determining whether the at least one configuration parameter has a particular configuration state matching a predefined state comprises:
    comparing the configuration state set to one or more predefined sets of configuration states; and determining whether the configuration state set matches at least one of the one or more predefined sets of configuration states.

11. The system of claim 9, wherein the machine language instructions are executable by the processor to revise the set of help topic descriptions comprises removing at least one description from the set.

12. The system of claim 9, wherein the machine language instructions are executable by the processor to revise the set of help topic descriptions comprises adding at least one description to the set.

13. The system of claim 9, wherein the machine language instructions are further executable by the processor to make the set of help topic descriptions available for access by a user through an electronic help system.

14. The method of claim 1, wherein revising the set of help topic descriptions available for access by the user comprises revising the set of help topic descriptions based at least in part on the configuration state of the at least one configuration parameter.

15. The method of claim 14, wherein the at least one configuration parameter comprises a plurality of configuration parameters having a respective set of configuration states, and wherein revising the set of help topic descriptions available for access by the user comprises revising the set of help topic descriptions based at least in part on the set of configuration states.

16. The system of claim 9, wherein the machine language instructions are executable to revise the set of help topic descriptions based at least in part on the configuration state of the at least one configuration parameter.

17. The system of claim 16, wherein the at least one configuration parameter comprises a plurality of configuration parameters having a respective set of configuration states, and wherein revising the set of help topic descriptions is based at least in part on the set of configuration states.

* * * * *